United States Patent
Simofi-Ilyes et al.

(10) Patent No.: US 8,398,378 B2
(45) Date of Patent: Mar. 19, 2013

(54) TANGENTIAL DRIVE MODULE ASSEMBLY AND METHOD OF ASSEMBLY FOR AIRFLOW INDUCTION

(75) Inventors: Attila Simofi-Ilyes, London (CA); Andrew Lakerdas, London (CA); Paul Stephen McLennan, London (CA)

(73) Assignee: Brose Fahrzeugteile GmbH & Co. Kommanditgesellschaft, Würzburg, Würzburg (DE)

(*) Notice: Subject to any disclaimer, the term of this patent is extended or adjusted under 35 U.S.C. 154(b) by 972 days.

(21) Appl. No.: 12/219,427

(22) Filed: Jul. 22, 2008

(65) Prior Publication Data

US 2009/0027853 A1    Jan. 29, 2009

Related U.S. Application Data

(60) Provisional application No. 60/935,040, filed on Jul. 24, 2007.

(51) Int. Cl.
 *F04B 35/04* (2006.01)
(52) U.S. Cl. ..................... 417/356; 417/423.7
(58) Field of Classification Search ............... 417/423.1, 417/356, 423.7, 420; 123/41.11; 416/3
See application file for complete search history.

(56) References Cited

U.S. PATENT DOCUMENTS

| | | | | |
|---|---|---|---|---|
| 3,621,822 A * | 11/1971 | Oster | | 123/41.12 |
| 4,358,245 A * | 11/1982 | Gray | | 416/189 |
| 4,459,087 A * | 7/1984 | Barge | | 417/356 |
| 4,634,343 A * | 1/1987 | Nakamats | | 416/3 |
| 4,953,811 A * | 9/1990 | Smith | | 244/17.19 |
| 4,962,734 A * | 10/1990 | Jorgensen | | 123/41.49 |
| 5,269,663 A * | 12/1993 | Cuniberti | | 417/356 |
| 6,194,798 B1 * | 2/2001 | Lopatinsky | | 310/63 |
| 6,600,249 B2 * | 7/2003 | Nelson et al. | | 310/91 |
| 7,032,859 B2 * | 4/2006 | Mohr | | 244/12.2 |
| 2003/0099561 A1 * | 5/2003 | Heydt et al. | | 417/423.1 |
| 2007/0024135 A1 | 2/2007 | Simofi-Ilyes | | |

* cited by examiner

*Primary Examiner* — Charles Freay
*Assistant Examiner* — Alexander Comley
(74) *Attorney, Agent, or Firm* — Manelli Selter PLLC; Edward J. Stemberger

(57) ABSTRACT

A fan module assembly includes at least one a rotatable fan (38) having blades (39) with tips of blades being joined by an annular fan band (42). An electrically conductive squirrel cage (46) is associated with the fan band to rotate therewith. Flux receiving structure (48) is associated with the fan band. A shroud (40) has a shaft (54) with the fan being associated with the shaft so as to rotate about the shaft and with respect to the shroud. Control structure (52) is mounted stationary with respect to the shroud generally adjacent to a portion of the fan band. The control structure is constructed and arranged to generate a changing magnetic field, generally at the radius of the fan band, which interacts with the flux receiving structure and the squirrel cage to cause the fan to be driven by tangential force.

20 Claims, 9 Drawing Sheets

TANGENTIAL DRIVE MODULE ASSEMBLY AND METHOD OF ASSEMBLY FOR AIRFLOW INDUCTION

This application claims the priority benefit of U.S. Provisional Application No. 60/935,040, filed on Jul. 24, 2007 and the content thereof is hereby incorporated by reference into this specification.

FIELD OF THE INVENTION

This invention relates to modules (electric motor, fan and shroud assembly) used in automotive, engine or battery cooling applications; however the same concept/method can be applied in other applications such as HVAC (Heating Ventilation and Air Conditioning).

BACKGROUND OF THE INVENTION

A conventional engine cooling module is shown, generally indicated at 10, in FIG. 1 and this type of module is described in the published U.S. Patent Application No. 20070024135, the contents of which is hereby incorporated by reference into this specification. The module includes a shroud 12, and a fan 14 and motor (not seen) for driving the fan 14. The motor is enclosed inside the central shield 16 of the shroud 12. There are also dual modules 10' as shown on FIG. 2 and these types of modules include two motors 18, two fans 14, and one shroud 12'). However, in both types of modules, the electric motor is a discrete subassembly and it is mounted on to the shroud at the center of the fan. A typical electric motor 18 used in these applications is shown in FIG. 3 (in the Patent Application No. 20070024135, shown in FIG. 6). The motor 18 includes four subassemblies: first, the stator assembly (motor case 20 with magnets 22 and ball bearing assembly 24); second, the armature assembly (assembly of shaft 26, commutator 28 and armature core 30 with copper windings (not shown)); and third, the brush card assembly 32; and fourth, the end cap assembly 34. These subassemblies are produced on dedicated assembly lines requiring a large capital investment. This is one of the disadvantages of the conventional brush type motor design.

In many new vehicle applications the shaft power (Pout) requirement of the engine cooling module is up to 800 W and considering the life/durability requirements of OEM specifications the conventional brush type motor design is not suited for such applications. Typically the brush type motors are limited to a shaft power of 400 W.

To further explain the power limitation of the conventional brush type motors the Shaft Power is defined by the following equation:

$$P_{out} = T * S \quad \text{(Eq. 1)}$$

where the T=Torque [N*m] and S=Rotational Speed [radians/sec]; Therefore with increasing shaft power requirement either the torque or the speed (or both) need to be increased proportionally.

However for optimum motor life the operating torque typically is limited to 10 to 15% of stall torque. The fan speed also needs to be carefully considered since fan noise is proportional to fan speed and the OEM's specifications require low noise levels even with increased power requirements. The change of fan noise in function of change of fan speed is graphically shown on FIG. 4. The graph function is defined by Eq. 2 at equal power and fan air density and it was derived from commonly known fan laws shown on Eq. 3.

$$L1 - L2 = 8 * \log_{10}(S1/S2) \quad \text{(Eq. 2)}$$

$$L1 - L2 = 14 * \log_{10}(P1/P2) + 8 * \log_{10}(S1/S2) + 6 * \log_{10}(\phi 1/\phi 2) \quad \text{(Eq. 3)}$$

where L is noise (sound) power level measured
P is fan power
S is fan speed
φ is fan air density Therefore an optimized high power module could be achieved if the motor can operate at high torque and low speed and still meet adequate motor life/durability with low sound levels.

Accordingly, there is a need to improve the engine cooling module design to reduce manufacturing cost, also can provide high power operations at high torque and low operating speed and still meet life/durability and acoustics requirements.

SUMMARY OF THE INVENTION

An object of the invention is to fulfill the need referred to above. In accordance with the principles of an embodiment of the present invention, a fan module assembly includes at least one a rotatable fan having blades with tips of blades being joined by an annular fan band. An electrically conductive squirrel cage is associated with the fan band to rotate therewith. Flux receiving structure is associated with the fan band. A shroud has a shaft with the fan being associated with the shaft so as to rotate about the shaft and with respect to the shroud. Control structure is mounted stationary with respect to the shroud generally adjacent to a portion of the fan band. The control structure is constructed and arranged to generate a changing magnetic field, generally at the radius of the fan band, which interacts with the flux receiving structure and the squirrel cage to cause the fan to be driven by tangential force.

In accordance with another aspect of an embodiment of the invention, a fan module assembly includes at least one a rotatable fan having blades with tips of blades being joined by an annular fan band. An electrically conductive squirrel cage is associated with the fan band to rotate therewith. Flux receiving structure is associated with the fan band. A shroud has a shaft with the fan being associated with the shaft so as to rotate about the shaft and with respect to the shroud. A stator assembly is mounted stationary with respect to the shroud generally adjacent to a portion of the fan band. The stator assembly includes a stator core and stator windings associated with the stator core. The stator assembly is constructed and arranged to generate a changing magnetic field, generally at the radius of the fan band, which interacts with the flux receiving structure and the squirrel cage to cause the fan to be driven by tangential force.

In accordance with another aspect of an embodiment of the invention, a method of driving a fan of a fan module of a vehicle provides at least one a rotatable fan having blades with tips of blades being joined by an annular fan band, and an electrically conductive squirrel cage being associated with the fan band to rotate therewith. A flux receiving structure is associated with the fan band. The method provides a stator assembly mounted stationary with respect to a shroud and generally adjacent to a portion of the fan band. The stator assembly includes a stator core and stator windings associated with the stator core. The stator windings are energized thereby generating a changing magnetic field, generally at the radius of the fan band, which interacts with the flux receiving structure and the squirrel cage to cause the fan to be driven by tangential force.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
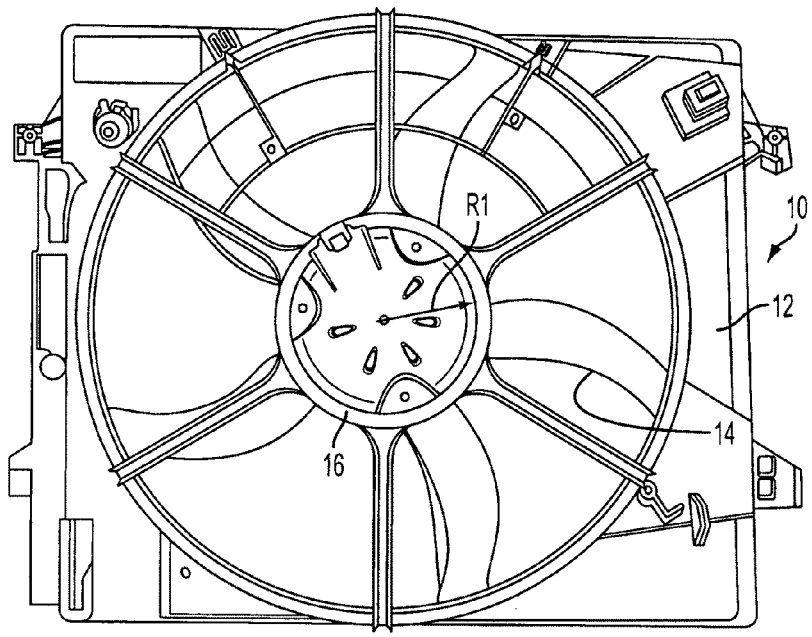
FIG. 1 is a view of a conventional "single" engine cooling module for a vehicle.
Figure 2:
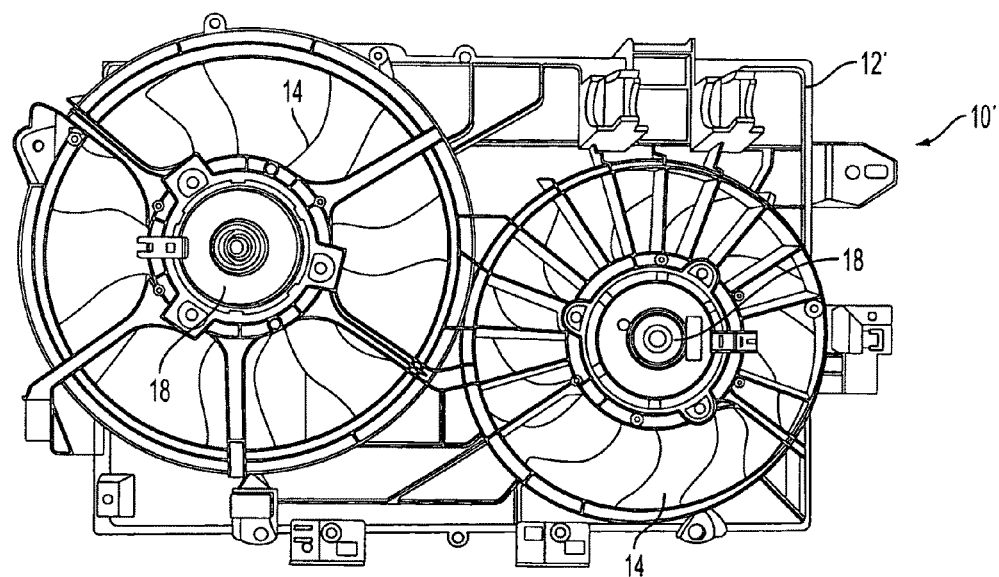
FIG. 2 is a view of a conventional "dual" engine cooling module for a vehicle.
Figure 3:
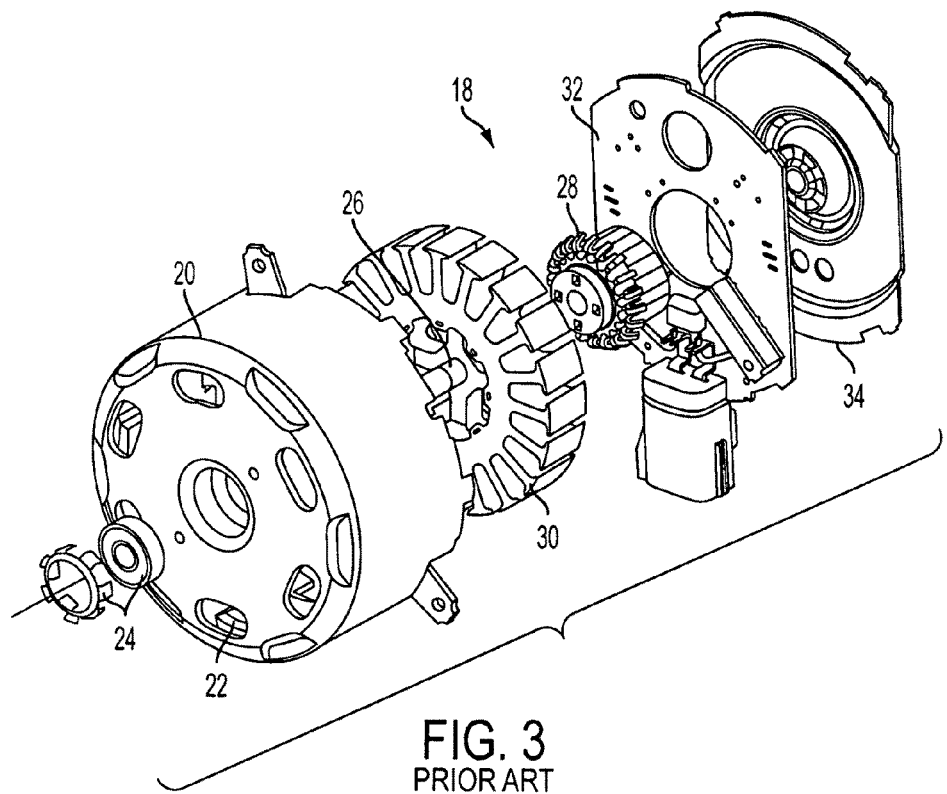
FIG. 3 is an exploded view of a conventional motor used in the engine cooling modules of FIGS. 1 and 2.
Figure 4:
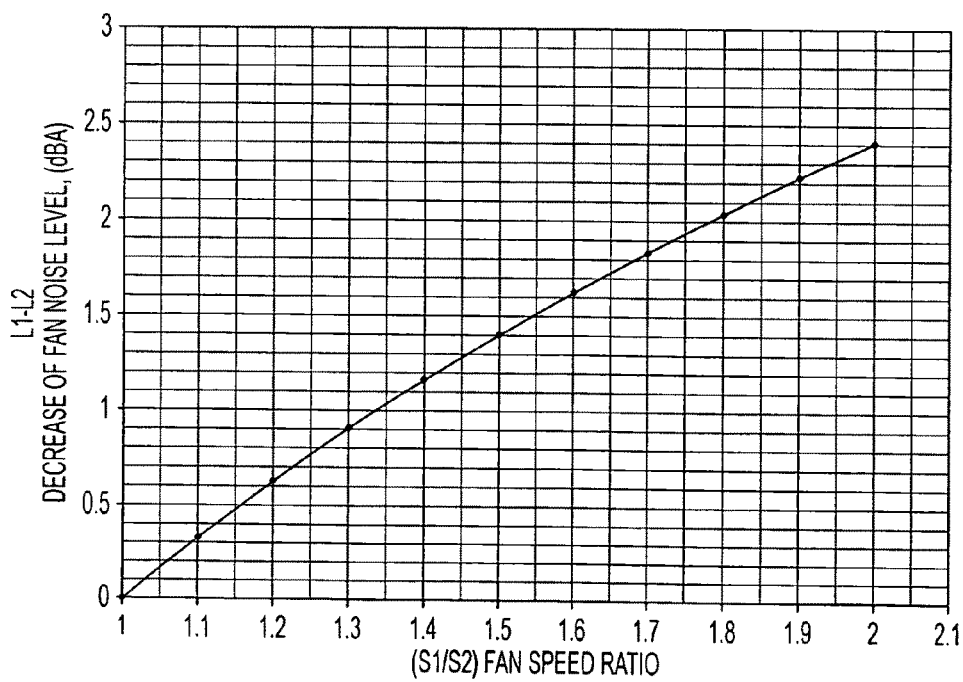
FIG. 4 shows the graph of fan noise level change in function of change in fan speed (for constant fan power and air density)
Figure 5:
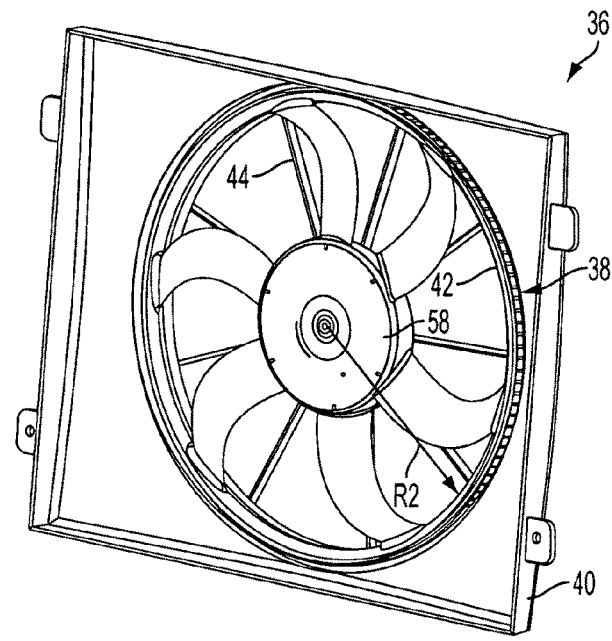
FIG. 5 is a front view of a Tangential Drive Module (TDM) of an embodiment of the invention.
Figure 6:
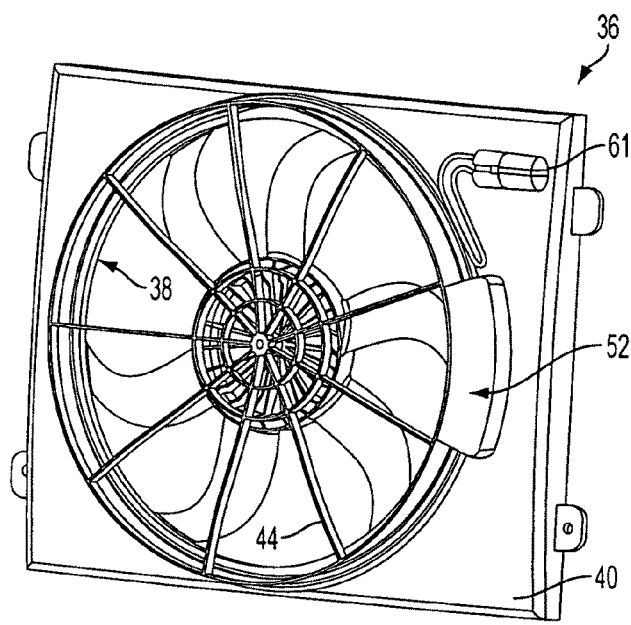
FIG. 6 is a rear view of the TDM of FIG. 5.
Figure 7:
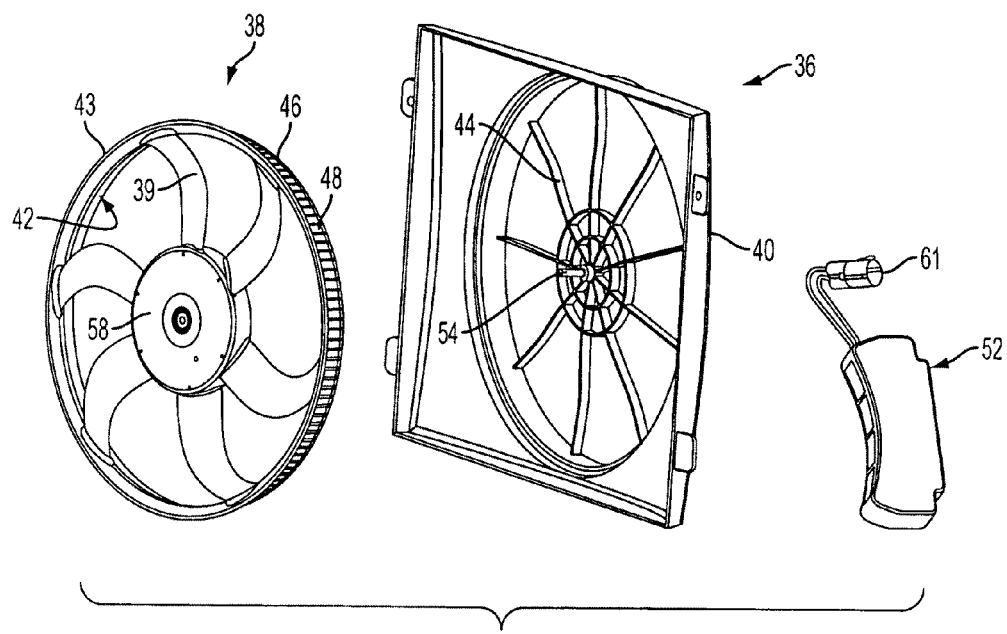
FIG. 7 is a view of the components of the TDM of FIG. 5.

A fan module, herein called TDM (Tangential Drive Module), in accordance with an embodiment of the invention, is shown generally indicated at 36 in FIG. 5 (front view) and FIG. 7 (rear view). The TDM 36 uses similar components (fan 38 with fan hub 58 and shroud 40) as the module 10 shown in FIG. 1. The TDM 36 fundamentally operates on similar electromagnetic principals as the module 10 of FIG. 1, except the required torque is generated at larger radial distance (R2) than R1 (FIG. 1) in the conventional module 10. Also, the TDM 36 is a brushless system. R1, shown in FIG. 1, is the radial distance to the air gap of the motor where the flux is generated and R2 shown in FIG. 5 is the radius to the fan band 42.

In the TDM 36, the Torque is generated at the tip of the fan band 42 at radial distance of R2 and R2=n*R1; where n>1 and it is a rational number. The value of R2 here is expressed as a function of R1 and "n" for the sake of comparison of the new TDM 36 to the conventional module 10; however R2 is the fan radius and it can be any size.

The equation 4 below defines the Torque in [N*m], where F=tangential force [N] and R=radial distance to the applied force F and this measured in [m].

$$T=F*R \quad \text{(Eq. 4)}$$

To prove mathematically the advantage of the new module TDM 36 over the conventional module 10 of FIG. 1, the new torque value (T2) of the TDM 36 can be calculated the following way:

$$T1=F1*R1$$

$$T2=F2*R2$$

However R2=n*R1 as defined above and assuming F2=F1

Therefore T2=n*T1, and by using Eq. 1 one can see that the shaft power can be increased by n times at the same fan speed. Also higher shaft power with lower or same sound levels can be achieved by proportionally adjusting the speed and torque.

The desired speed and torque can be achieved by careful design of the magnetic poles of the stator (flux density) and the supply or driving/switching frequency.

Figure 8:
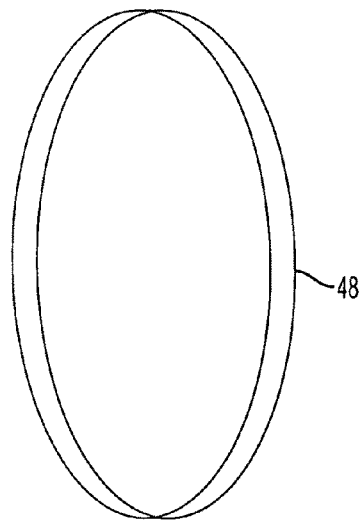
FIG. 8 is a view of a back iron ring of the TDM of FIG. 7.

The three major sub-components/assemblies of TDM 36 are shown in FIG. 7. The fan 38 includes fan hub 58, blades 39, an electrically conductive squirrel cage 46, and flux receiving structure in the form of a back iron 48, preferably molded into the annular fan band 42. The squirrel cage 46 can be insert molded, snap fit, pressed on riveted, etc., with respect to the fan band 42 or fan lip 43. The fan lip 43 can be considered to be part of the fan band 42. FIG. 8 shows the back iron 48 in the form of an annular ring. The back iron ring 48 can be molded or attached to the fan band 42 or to the fan lip 43 and thus rotates with the fan 38. The back iron 48 in such applications is preferably made out of soft magnetic composite or lamination quality steel. FIG. 7 shows the shroud 40 and a control structure 52 with connector lead wire assembly 61 for power input, generally indicated at 52. The control structure 52 is a device that generates moving or changing magnetic field and controls rotational speed of the fan 38. The stator arms 44 of the shroud 40 support a shaft 54 that is received by bearing 88 (FIG. 20) of the fan 38.

An advantage of the TDM 36 is that the mass of the shroud 40 and stator arms 44 can be reduced because the arms 44 only support the fan mass and the control structure 52. Lower supported mass at the center of the shroud can translate into higher first mode natural frequency under axial excitation. (There is no heavy mass of the motor in the center of the shroud as in the conventional configuration of FIG. 1).

Figure 9:
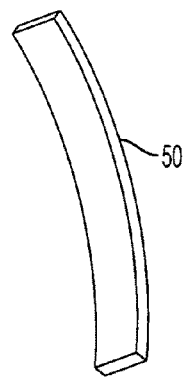
FIG. 9 shows a section of back iron which can be used in place of the ring of FIG.8.
Figure 10:
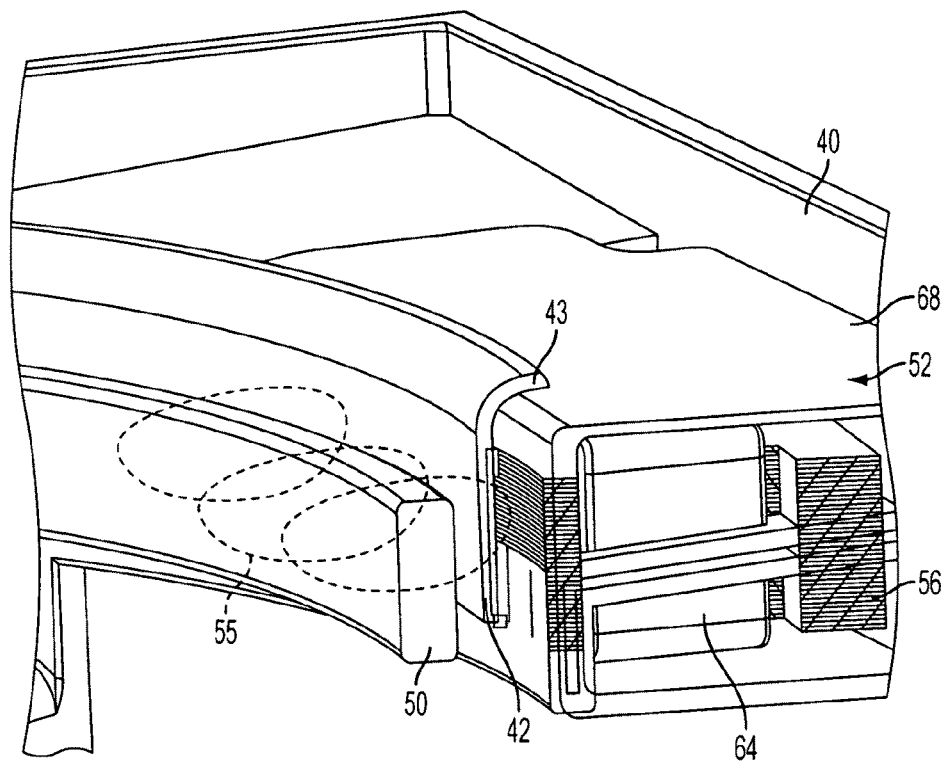
FIG. 10 is a sectional view of another embodiment of the TDM assembly with the section of back iron fixedly mounted onto the shroud.

Alternatively, the back iron 48 can be just an arc-shaped section 50 of a ring as shown in FIG. 9. In this case, the wall thickness of the section is increased. FIG. 10 shows the section 50 mounted onto the shroud 40, generally adjacent to the control structure 52. The back iron section 50 is made out of steel or soft magnetic composites. The squirrel cage 46 is insert-molded or mounted onto the fan band 42. The orientation of the magnetic flux circuit and lines 55 are also shown in FIG. 10. The stator core 56 and windings 64 are disposed in the housing 68 of the control structure 52.

Figure 11:
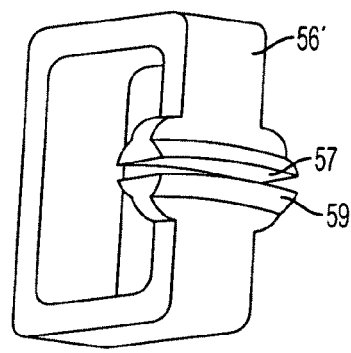
FIG. 11 is a view of a one-piece stator core and back iron defining a G-core.
Figure 12:
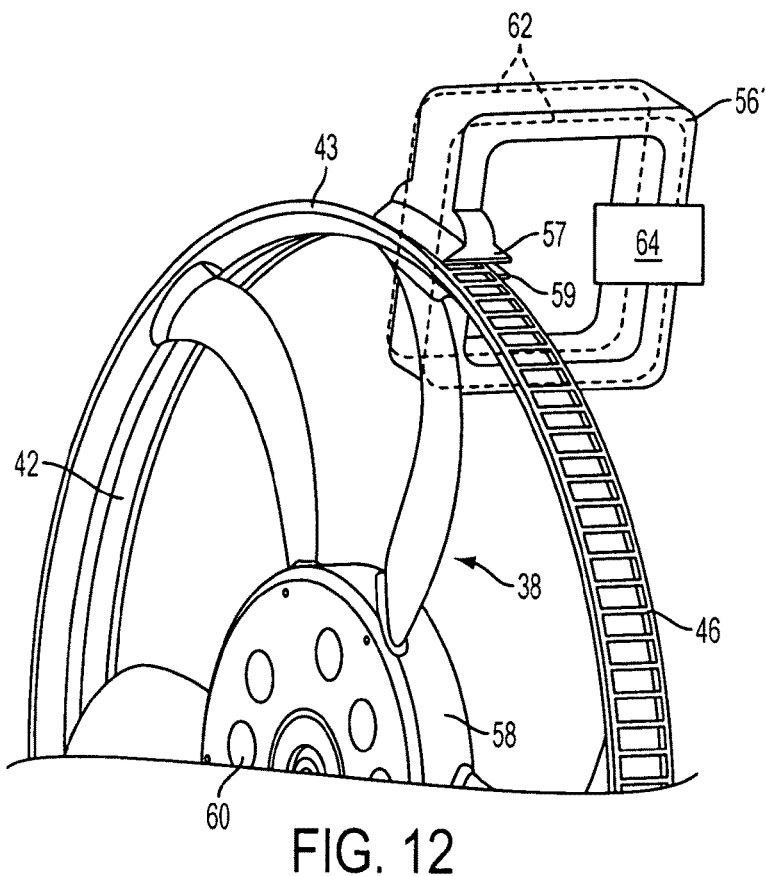
FIG. 12 is a view of an assembly of the G-core of FIG. 11 with a fan.

The back iron also can be integral with the stator core 56. A "one piece stator core and back iron" (herein called G-core 56') is shown in FIG. 11. The G-core 56' includes a first end 57 and an opposing second end 59. The ends 57 and 59 are curved so as to receive a portion of the fan band 42 therebetween (FIG. 12). The G-core 56' can be manufactured from (but not limited to) a soft magnetic composite material and several of these G-cores would be mounted onto the shroud 40 together with the control structure 52, depending on the magnetic flux requirement.

For clearer illustration purposes, FIG. 12 shows a simplified assembly of the fan 38 and the G-core 56'. In FIG. 12, a typical fan configuration for an engine cooling application is shown with the new feature of the insert molded squirrel cage 46 and the fan hub 58 with vent holes 60. The vent holes 60 are added into the hub 58 to minimize radiator coverage. The magnetic flux circuits 62 are identified on the G-core 56' together with the windings 64. An advantage of this structure over the two-piece part (shown in FIG. 10) is that the magnetic flux circuit has half of the number of air gaps. An air gap is identified in a magnetic flux circuit where the magnetic flux lines travel (jump) through other media or material than the steel/iron or some type of material such as air, plastic, wood and etc. . . . (these materials have significantly lower permeability than steel).

Figure 13:
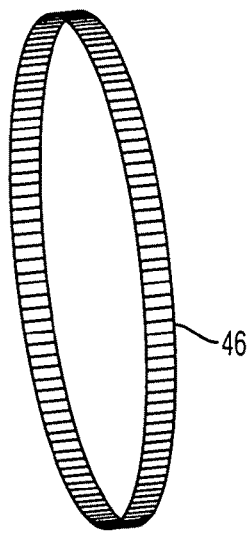
FIG. 13 is a view of a squirrel cage of the TDM.

FIG. 13 shows the squirrel cage 46 preferably made out of a material that has good electrical conductivity, such as copper or aluminum. The squirrel cage 46 can be attached (molded or fastened) to the fan band 42 or the lip 43 (FIG. 12).

Figure 14:
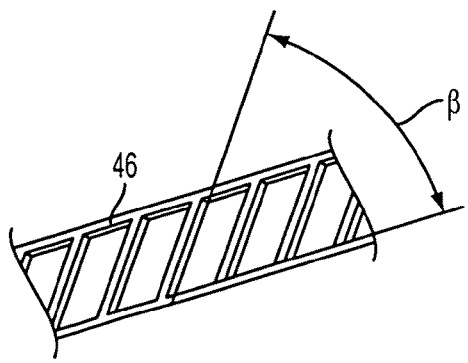
FIG. 14 is view of a portion of the squirrel cage of FIG. 13 showing an angle β.

The patterns on the squirrel cage are similar to the ones used in induction motors. The angle β shown in FIG. 14 is typically skewed to minimize torque ripple and essentially reduce vibration and noise of the fan/module.

Figure 15:
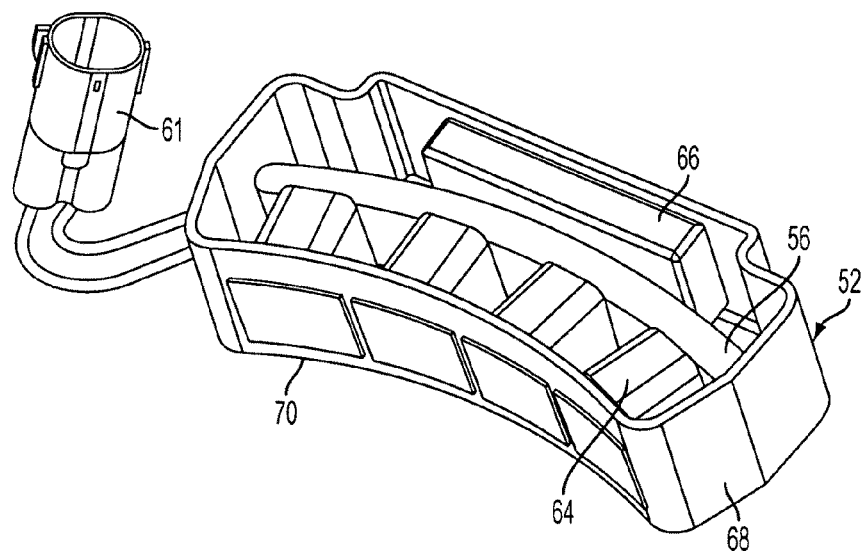
FIG. 15 shows the control structure of the TDM of FIG. 7.

FIG. 15 shows the control structure 52 with lead wire and connector 61 for electrical power input to 52 (cover and fastening features are not shown). The control structure 52 includes electronic structure 66 that conveys power to the coils (stator windings 64) and provides logic and sequence to energize the coils. The electronic structure 66 can also provide fault protection to the module such as over heat, overload, etc. Also the electronic structure 66 can be mounted outside of the 52 somewhere else in the vehicle. The stator core 56 or 56' is provided in a housing 68 of the control structure 52 and is associated with the stator windings 64. The housing 68 has a curved profile 70 that is concentric with the fan band 42 or fan lip 43

Figure 16:
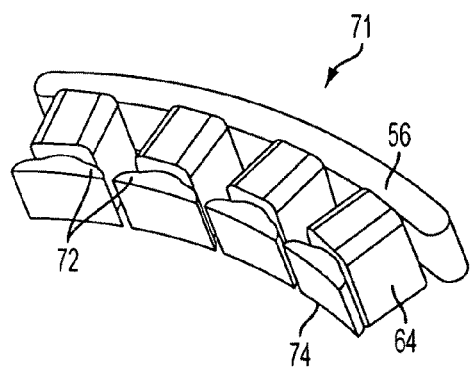
FIG. 16 shows the stator core with coils of the control structure of FIG. 15.

The stator assembly, generally indicated at 71, including the stator core 56 and stator windings 64 is shown in FIG. 16. The stator core 56 is preferably made out of magnetic material steel laminations or molded out of soft magnetic composites. The coils 64 can be wrapped individually on each tooth 72 of the stator core 56 or over several teeth. For a three phase-winding, the coil span would be over three teeth and stator core 56 would have at least five teeth. The number of turns of the stator winding or coils 64 depends on the application requirement (for higher torque requirement the number of turns or the conductor size can be increased; also the stator core size can be changed depending on the power requirement). Each stator tooth 72 has a curved profile 74 that is concentric with the fan band 42 of fan lip 43.

Figure 17:
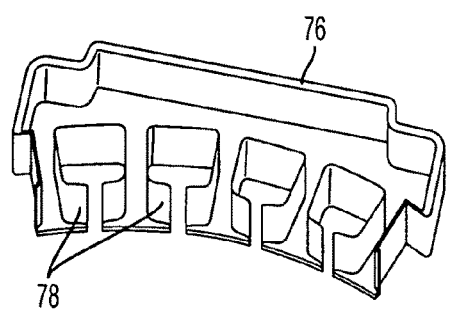
FIG. 17 is a stator core insulator for the control structure of FIG. 15.

FIG. 17 shows a stator core insulator 76 the function of which is to electrically insulate the coils 64 from the stator core 56. The teeth profiles 78 can be molded into the control structure 52 or into the shroud 40.

Figure 18:
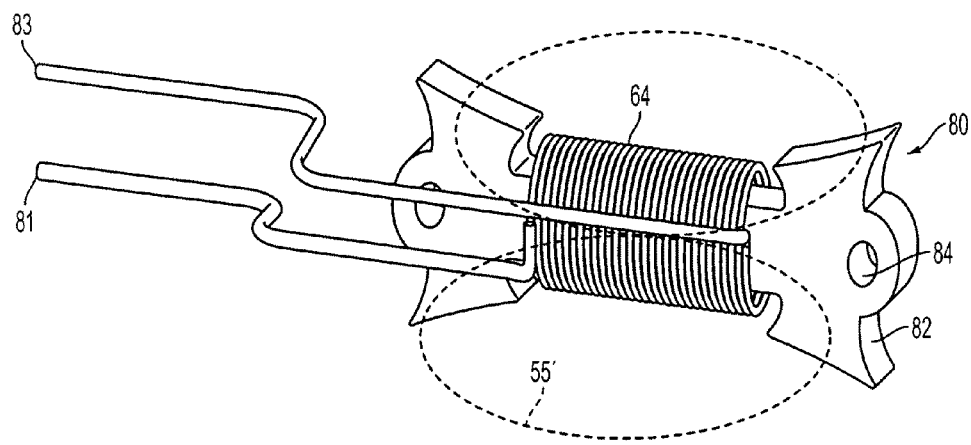
FIG. 18 is a dual pole piece for a dual fan drive application of a TDM.
Figure 19:
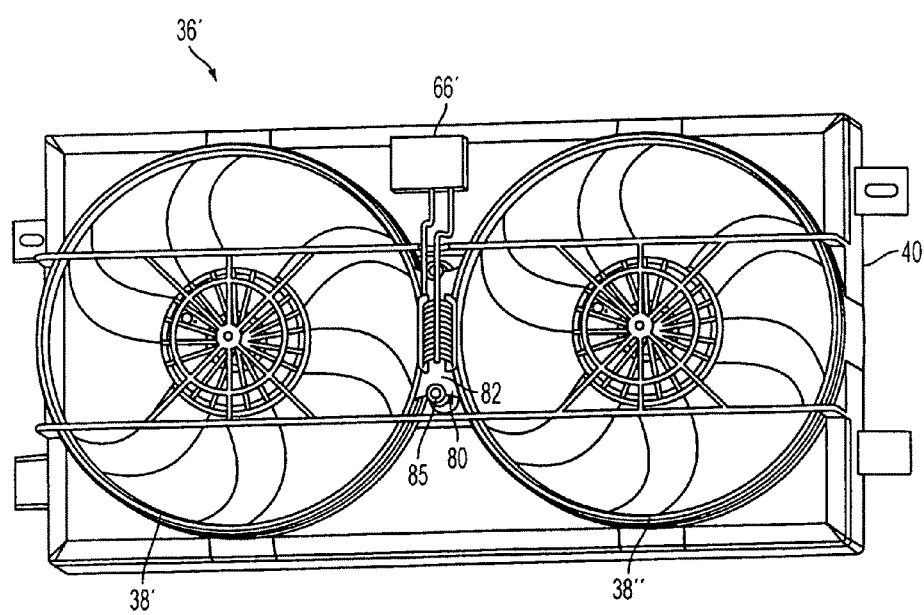
FIG. 19 is an embodiment of a dual TDM.

A dual pole core for a dual fan drive application of a TDM is shown, generally indicated at 80, in FIG. 18. The dual pole core 80 can be achieved with an H-core 82 and stator windings 64 as shown. The dual pole core 80 is part of the control structure 52 and can be provided in a housing (not shown). Terminals 81 and 83 are provided for the stator windings 64. The H core can be placed into a protective housing similarly as 71 also fastened to the shroud at mounting holes 84. FIG. 19 shows a dual TDM 36' where two fans 38' and 38" are driven simultaneously with the dual pole core there-between.

The electronic structure 66' can be integrated into the module 36' or can be placed somewhere else in the vehicle.

Figure 20:
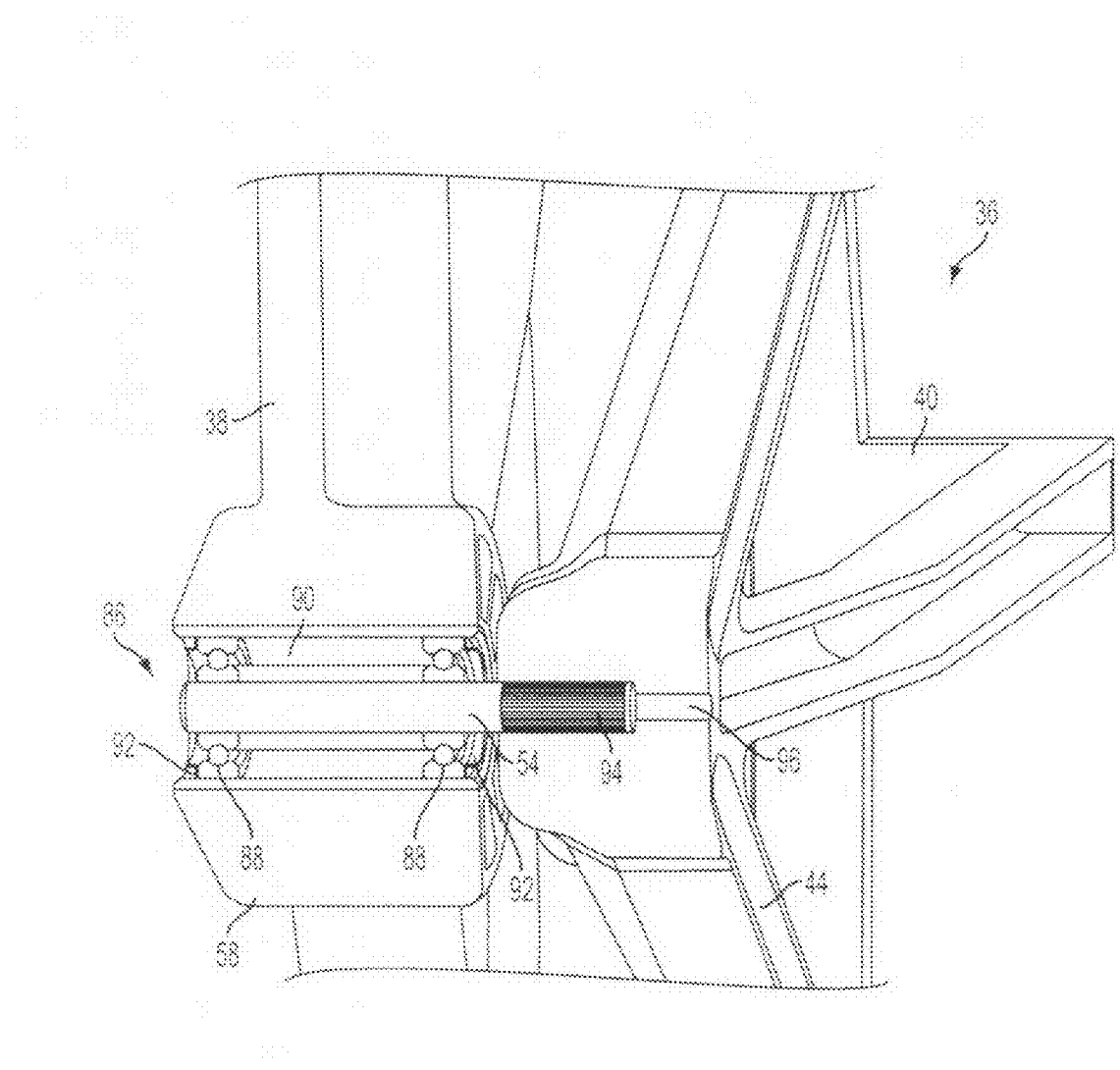
FIG. 20 is a sectional view of a portion of a TDM showing details of the assembly of a fan to a shroud.

One of the challenges of the TDM 36, 36' is to maintain small air gap between the squirrel cage 46 and the stator core 56 and back iron 48 (or just the G-core 56') for optimum operation. Therefore it is important to develop an assembly method that results in a tight assembly tolerance (low fan run out and tight positioning tolerance and concentricity of fan and control structure 52 to shroud can results in low air gap range). An example of fan attachment method is detailed on FIG. 20. On FIG. 20 is shown a partial sectional view of a portion of the TDM 36 detailing the assembly of the fan 38 to the shroud 40. The fan hub 58 includes a bearing assembly, generally indicated at 86. The bearing assembly 86 includes at least one bearing 88 (two shown), a spacer 90 and bearing retainers 92 retaining the bearings 88 and spacer 90 in the hub 58. The bearing assembly 86 permits the fan 38 to rotate about the shaft 54. The end of the shaft fixed to the shroud 40 can include serrations or other surface features 94 to allow good bonding and engagement/locking of the shaft 54 to the shroud 40. An access hole 96 is provided in the shroud 40 and is used to support the shaft 54 during attachment. Also machining the surface of the fan band or lip after mounted onto the shroud to reduce run out can be considered.

Some features of the embodiments are:
1. To drive at least one fan 38 tangentially by a changing magnetic field (electromagnetic induction) at the radial distance "R2" from the center of the fan; where "R2" approximately equals to the radius of the fan band 42.
2. A squirrel cage 46 can be embedded into the fan band 42 or the fan lip 43.
3. The operating torque can be increased by increasing number of turns in the stator assembly or increasing the wire thickness or the axial length of the unit.
4. To minimize radiator coverage/blockage and promote air flow at ram air condition the fan hub size can be reduced. Also openings can be added onto the fan hub for the same reason.
5. The squirrel cage 46 is preferably an integral part of the fan band 42 and it rotates with the fan 38.
6. The control structure 52 that produces the changing magnetic flux is stationary and it is mounted onto the shroud at a radial distance of [(Fan radius)+(Fan run out)+(manufacturing clearance)]
7. The back iron section 50 can also be stationary and can be part of the control structure 52 mounted onto the shroud at a radial distance of {[(Fan radius)−[(Fan run out)+(manufacturing clearance)]}.
8. The back iron 48 and the squirrel cage 46 can be an integral part of the fan band 42 or the fan lip 43.
9. The back iron 48 can be integrated into the stator core as the G-core 56'.
10. Multiple fans 38', 38" can be driven at the same time.
11. One control structure 52 with H-core 82 can be placed between two fans and same drive unit used to drive both fans simultaneously at the same speed.
12. The control structure 52 can drive one or more fans at the same time
13. More than one pole pieces can be placed together to form a single part.
14. The control structure 52 provides protection to TDM.
15. The back iron 48 can be a section 50 of a ring.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A fan module assembly comprising:
   at least one rotatable fan having blades, tips of blades being joined by an annular fan band, an electrically conductive squirrel cage being associated with the fan band to rotate therewith,
   flux receiving structure associated with the fan band, the flux receiving structure being made of soft magnetic material that can be magnetized but does not remain magnetized,
   a shroud having a shaft, the fan being associated with the shaft so as to rotate about the shaft and with respect to the shroud, and
   only one localized, single control structure mounted stationary with respect to the shroud generally adjacent to one portion of the fan band, the single control structure being constructed and arranged to generate a localized and balanced changing magnetic field, generally at a radius of the fan band, which interacts with the flux receiving structure and the squirrel cage to alone cause the fan to be driven by tangential force without the use of permanent magnets.

2. The fan module of claim 1, wherein the flux receiving structure is an annular flux ring coupled with the fan band.

3. The fan module of claim 1, wherein the flux receiving structure is an arc-shaped section mounted stationary on the shroud, the fan band being disposed between the arc-shaped section and the control structure.

4. The fan module of claim 1, wherein the squirrel cage is embedded in the fan band.

5. The fan module of claim 1, wherein the control structure includes a stator core, stator windings associated with the stator core and electronic structure constructed and arranged to convey power to the stator windings.

6. The fan module of claim 5, wherein the stator core has a portion with a curved profile that is concentric with respect to the fan band.

7. The fan module of claim 6, wherein the control structure further includes a housing, the stator core, the stator windings, and the electronic structure being disposed in the housing, the housing having a curved profile receiving the curved profile portion of the stator core.

8. The fan module of claim 6, wherein the portion with a curved profile are stator teeth upon which the stator windings are wound.

9. The fan module of claim 7, further including a stator core insulator constructed and arranged to electrically insulate the stator windings from the stator core.

10. The fan module of claim 5, wherein the flux receiving structure is integral with the stator core and includes a first end and an opposing second end, the first end and the second end form a gap for receiving a portion of the fan band there-between, the second end is radially closer to an axis of rotation of the fan than the first end and the fan band includes an internal surface and an external surface, wherein the internal surface is radially closer to the axis of rotation of the fan than the external surface, the ends being curved so as to receive the portion of the fan band there-between such that the first end is adjacent to the internal surface and the second end is adjacent to the external surface.

11. The fan module of claim 1, wherein a first fan and a second fan are provided, the first fan is rotatable about a first shaft of the shroud and the second fan is rotatable about a second shaft of the shroud, the first shaft and the second shaft are spaced from each other but parallel to each other, a flux receiving structure being associated with each fan band, and wherein the control structure includes a dual pole core disposed between the fans and associated with the flux receiving structures to drive the first fan and the second fan simultaneously.

12. A fan module assembly comprising:
   at least one rotatable fan having blades, tips of blades being joined by an annular fan band, an electrically conductive squirrel cage being associated with the fan band to rotate therewith,
   flux receiving structure associated with the fan band, the flux receiving structure being made of soft magnetic material that can be magnetized but does not remain magnetized,
   a shroud having a shaft, the fan being associated with the shaft so as to rotate about the shaft and with respect to the shroud, and
   only one localized, single stator assembly mounted stationary with respect to the shroud generally adjacent to one portion of the fan band, the single stator assembly including a stator core and stator windings associated with the stator core, the single stator assembly being constructed and arranged to generate a localized and balanced changing magnetic field, generally at a radius of the fan band, that interacts with the flux receiving structure and the squirrel cage to alone cause the fan to be driven by tangential force without the use of permanent magnets.

13. The fan module of claim 12, wherein the flux receiving structure is one of an annular flux ring coupled with the fan band or an arc-shaped section mounted stationary on the shroud with the fan band being disposed between the arc-shaped section and the stator assembly.

14. The fan module of claim 12, further including electronic structure constructed and arranged to convey power to the stator windings.

15. The fan module of claim 12, wherein the stator core has a portion with a curved profile that is concentric with respect to the fan band.

16. The fan module of claim 12, wherein the flux receiving structure is integral with the stator core and includes a first end and an opposing second end, the first end and the second end form a gap for receiving a portion of the fan band there-between, the second end is radially closer to an axis of rotation of the fan than the first end and the fan band includes an internal surface and an external surface, wherein the internal surface is radially closer to the axis of rotation of the fan than the external surface, the ends being curved so as to receive the portion of the fan band there-between such that the first end is adjacent to the internal surface and the second end is adjacent to the external surface.

17. The fan module of claim 12, wherein a first fan and a second fan are provided, the first fan is rotatable about a first shaft of the shroud and the second fan is rotatable about a second shaft of the shroud, the first shaft and the second shaft are spaced from each other but parallel to each other, a flux receiving structure being associated with each fan band, and wherein the stator core is a dual pole core disposed between the fans and associated with the flux receiving structures to drive the first fan and second fan simultaneously.

18. A method of driving a fan of a fan module of a vehicle, the method comprising:
   providing at least one rotatable fan having blades with tips of blades being joined by an annular fan band, and an electrically conductive squirrel cage being associated with the fan band to rotate therewith, providing flux receiving structure associated with the fan band, the flux receiving structure being made of soft magnetic material that can be magnetized but does not remain magnetized, providing only one localized, single stator assembly mounted stationary with respect to a shroud and generally adjacent to one portion of the fan band, the single stator assembly including a stator core and stator windings associated with the stator core, and energizing the stator windings thereby generating a localized and balanced changing magnetic field, generally at a radius of the fan band, which interacts with the flux receiving structure and the squirrel cage to alone cause the fan to be driven by tangential force without the use of permanent magnets.

19. The method of claim 18, wherein the step of providing the flux receiving structure includes providing one of an annular flux ring coupled with the fan band or providing an arc-shaped section mounted stationary on the shroud with the fan band being disposed between the arc-shaped section and the stator assembly.

20. A fan module assembly comprising:

at least one rotatable fan having blades, tips of blades being joined by an annular fan band, an electrically conductive squirrel cage being associated with the fan band to rotate therewith, flux receiving structure associated with the fan band, a shroud having a shaft, the fan being associated with the shaft so as to rotate about the shaft and with respect to the shroud, and only one control structure mounted stationary with respect to the shroud generally adjacent to one portion of the fan band, the control structure being constructed and arranged to generate a changing magnetic field, generally at the radius of the fan band, which interacts with the flux receiving structure and the squirrel cage to cause the fan to be driven by tangential force, wherein the control structure includes a stator core, stator windings associated with the stator core and electronic structure constructed and arranged to convey power to the stator windings, and wherein the flux receiving structure is integral with the stator core and includes a first end and an opposing second end, the first end and the second end form a gap for receiving a portion of the fan band there-between, the second end is radially closer to an axis of rotation of the fan than the first end and the fan band includes an internal surface and an external surface, wherein the internal surface is radially closer to the axis of rotation of the fan than the external surface, the ends receiving a portion of the fan band there-between such that the first end is adjacent to the internal surface and the second end is adjacent to the external surface.

\* \* \* \* \*